United States Patent [19]
Winter et al.

[11] Patent Number: 5,415,564
[45] Date of Patent: May 16, 1995

[54] JUNCTION BOX FOR QUICK RELEASE MOUNTING OF ELECTRICAL CIRCUIT COMPONENTS

[76] Inventors: Craig Winter, 3035 Freedom Blvd.; Hal Mitchell, 147 Rider Rd.; Robert J. M. Curmpton, 119 Brown Valley Rd., all of Watsonville, Calif. 95076

[21] Appl. No.: 182,532

[22] Filed: Jan. 14, 1994

Related U.S. Application Data

[63] Continuation of Ser. No. 944,858, Sep. 14, 1992, abandoned.

[51] Int. Cl.$^6$ ............................................. H01R 13/60
[52] U.S. Cl. ..................................... 439/535; 439/540
[58] Field of Search ....................... 439/535, 536, 540; 179/57, 58

[56] References Cited

U.S. PATENT DOCUMENTS

| | | |
|---|---|---|
| 3,842,320 | 10/1974 | Kiesling . |
| 3,909,912 | 10/1975 | Kiesling . |
| 4,165,443 | 8/1979 | Figart et al. ..................... 439/535 X |
| 4,413,307 | 11/1983 | Butte et al. . |
| 4,778,399 | 10/1988 | Schenk . |
| 4,814,941 | 3/1989 | Speet et al. . |
| 4,968,855 | 11/1990 | LePaillier . |
| 4,984,982 | 1/1991 | Brownlie et al. . |
| 4,993,970 | 2/1991 | Littrell . |
| 5,021,608 | 6/1991 | Hadfield . |
| 5,106,325 | 4/1992 | Robinson et al. ................ 439/535 X |

Primary Examiner—Eugene F. Desmond
Attorney, Agent, or Firm—Townsend and Townsend Khourie and Crew

[57] ABSTRACT

Improvements in wiring assemblies using an electrical junction box assembly having preset electrical terminals. Such present terminals are hard-wired to certain electrical connection devices near the outer periphery of the box. Electrical components, such as a switch, a receptacle and the like can be quickly and easily mounted in place in the box in electrical contact with respective preset terminals. The selective electrical component can be provided with a number of pins at predetermined locations for electrical contact with certain of the preset terminals. One or more power-receiving members, such as a light fixture, can be coupled to respective outer peripheral electrical connection devices for receiving the three or four individual wires of an electrical line from each power-receiving member. The terminals in the box and the electrical connection devices represent an assembly with a quick release fastening capability which adapts the box for connection between a circuit component, such as a switch or an electrical power-receiving member. The electrical components are predetermined as to how they are to be used in a circuit. In this way, the time required to wire a house or building will be reduced and labor costs would be correspondingly lowered. Two or more boxes of the present invention can be ganged to make them suitable for use where, for instance, switches are to be placed side by side to each other, as well as to mount female receptacles adjacent to each other.

6 Claims, 8 Drawing Sheets

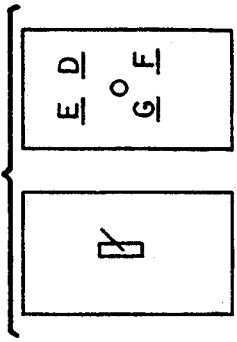
FIG. 14
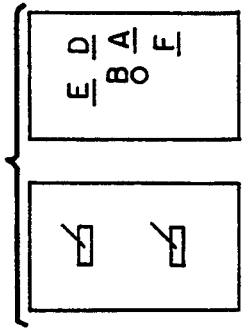
FIG. 13
TANDEM 3W, 2W
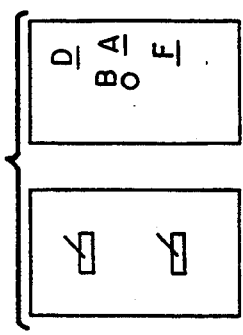
FIG. 12
TANDEM SWITCH
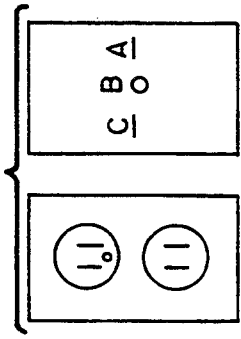
FIG. 11
PLUG
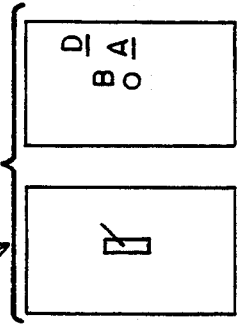
SWITCH → FIG. 10
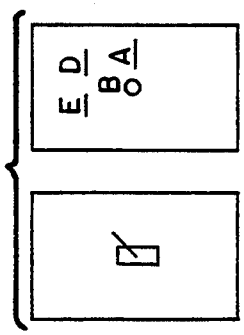
FIG. 9
3-WAY SWITCH
1ST & 2ND
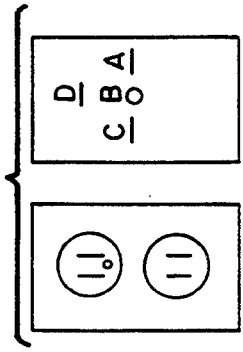
FIG. 8
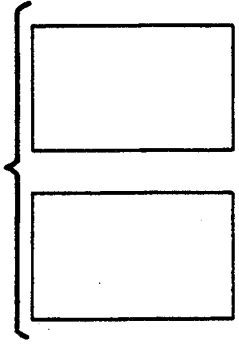
JUNCTION FUNCTION
FIG. 7
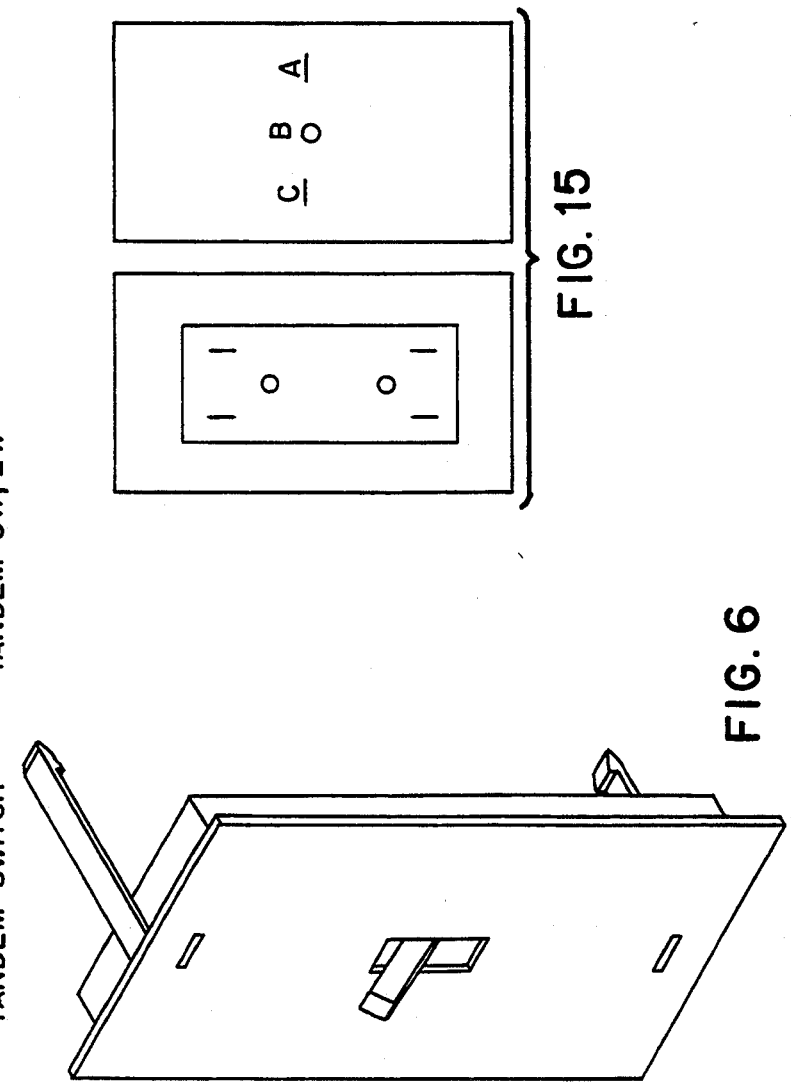
FIG. 15
FIG. 6

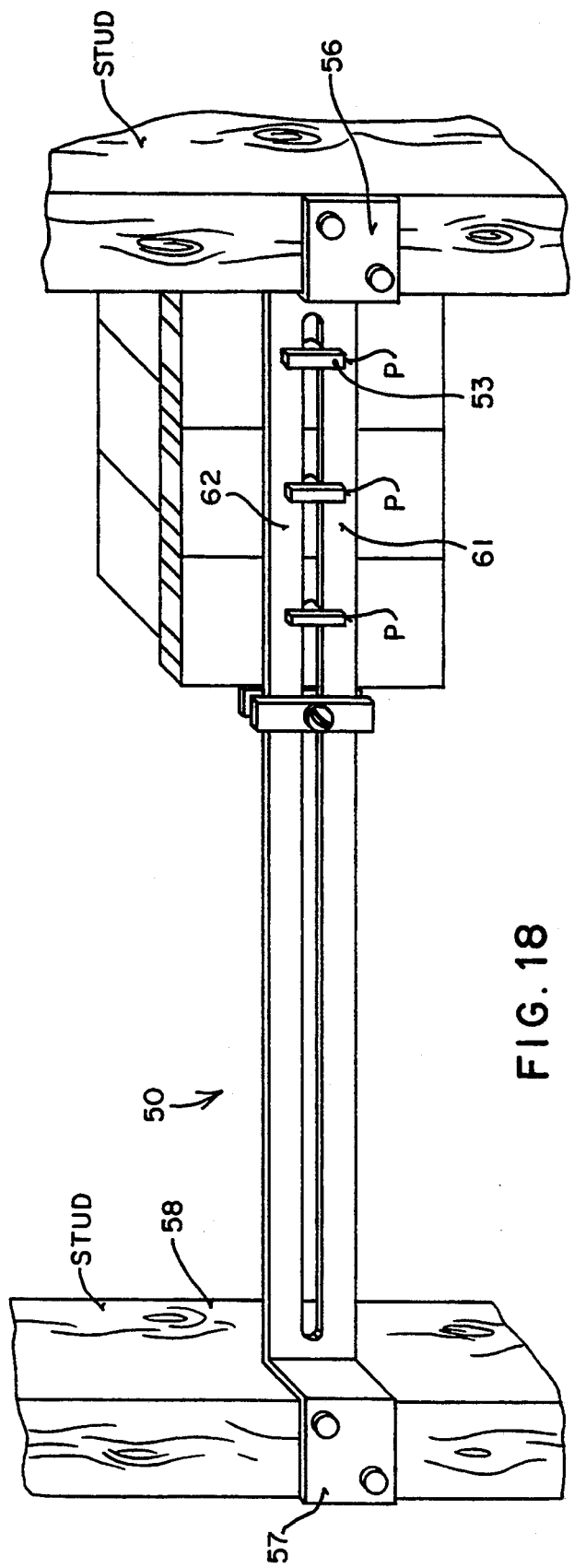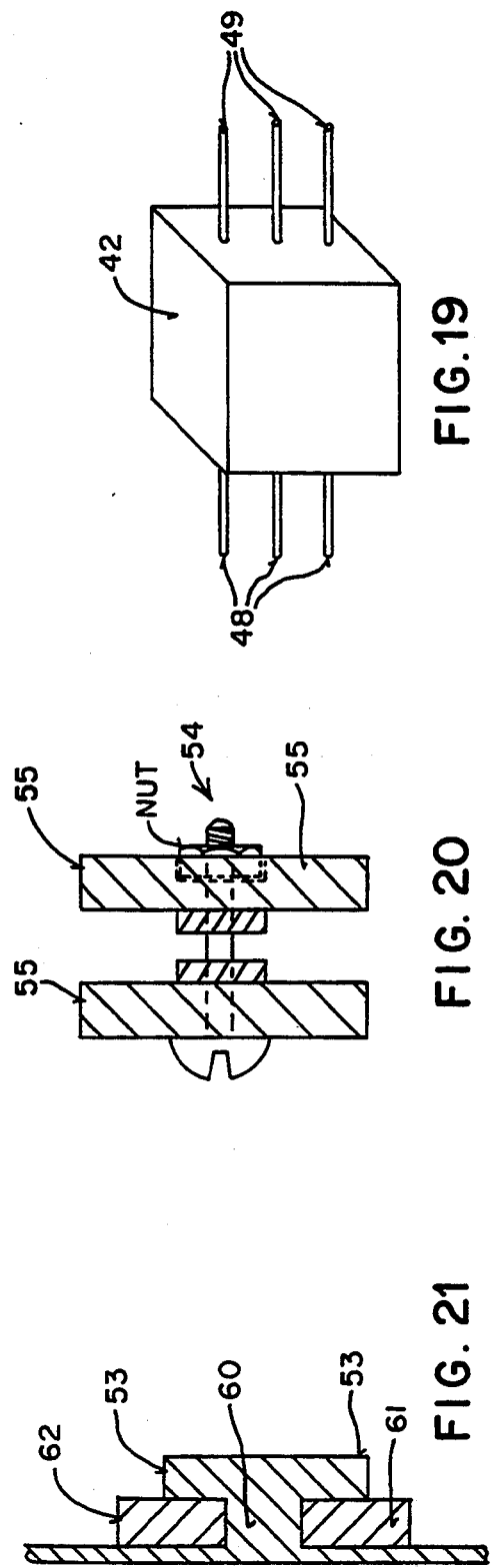

JUNCTION BOX FOR QUICK RELEASE MOUNTING OF ELECTRICAL CIRCUIT COMPONENTS

This is a continuation of application Ser. No. 07/944,858, filed Sep. 14, 1992, now abandoned.

This invention relates to improvements in the electrical wiring of houses and buildings and, more particularly, to an electrical wiring assembly adapted for quick release mounting of any one of a number of electrical components to an electrical circuit line.

BACKGROUND OF THE INVENTION

Conventional electrical wiring techniques using junction boxes have not changed for a period of years. Typically, a junction box is mounted in some suitable manner on a support, such as an adjacent vertical stud, and electrical leads are brought to the box and then are forced into the box from at least two locations. Sometimes there are as many as four to six wires forced into a junction box. The box can easily become quite crowded with wires, and all the wires must be connected to other specific wires to complete the circuits formed by the components on the outer ends of the wires.

Generally, the handling of a plurality of electrical wires and the interconnecting of such wires with circuit components is a time-consuming task which generates high labor and parts costs. The biggest expense is, of course, the time consumed in wiring a house or building in which every junction box essentially has the same requirement, namely to interconnect a plurality of wires in the box, to force the wires into the box along with possibly a switch or a receptacle, and then to close the box with a cover plate on the outer, open face of the box.

With the present techniques being adequate but costly for use, there seems to be little or no incentive to improve upon such techniques, especially in the area of reducing the time spent in wiring a house or building. If such time could be reduced, however, a considerable saving of labor costs could be realized, and a requirement for skills necessary in wiring a house or building can be reduced. Thus, improvements in wiring techniques are especially welcome since a long felt need for improvements in this area has existed for some time.

SUMMARY OF THE INVENTION

The present invention provides improvements in electrical wiring assemblies by providing an electrical junction box assembly having preset electrical terminals mounted in place at predetermined locations in the box. Such preset terminals are hard-wired to certain functional line attachments near the outer periphery of the box. Thus, any one of a plurality of electrical components, such as a switch and its switch plate, can be selected and quickly and releasably mounted in place in the box in electrical contact with respective preset terminals.

The selected electrical component can be provided with a number of electrical contact pins at predetermined locations for electrical contact with certain of the preset terminals. The box need only be mounted in a suitable location on a support, such as on an adjacent vertical stud and one or more power-receiving members, such as a light fixture can be coupled to respective outer peripheral functional line attachments, such as tubular elements, for receiving the three or four individual wires of an electrical line from each power-receiving member. Thus, the terminals in the box and the functional line attachments represent an assembly with a quick release fastening capability which adapts the box for connection between a circuit component, such as a switch and an electrical power-receiving member. Thus, the electrical components are predetermined as to how they are to be used in a circuit. The electrical contact pins of each component are preselected as to contact a particular group of the preset terminals of the box. Thus, a workman can remove one type of component and replace it with another different component, if desired. In this way, the time required to wire a house or building will be reduced and labor costs would be correspondingly lowered.

Two or more boxes of the present invention can be ganged to make them suitable for use where, for instance, switches are to be placed side by side to each other, as well as to mount female receptacles adjacent to each other.

The primary object of the present invention is to provide an improved electrical wiring assembly in which a junction box has electrical terminals mounted therein at predetermined locations and certain of which terminals are adapted to be engaged by preselected contact pins of an electrical circuit component so that the component can be coupled quickly and easily to the terminals and the terminals can be coupled to a quick release electrical connection device on the box to couple the box terminals to a power-receiving member remote from the box, whereby the cost of wiring a house or building is significantly reduced and the wiring step itself can be done quickly and easily so long as the function of the component is known.

Other objects of this invention will become apparent as the following specification progresses, reference being had to the accompanying drawings for an illustration of the invention.

BRIEF DESCRIPTION OF THE DRAWINGS

FIGS. 1A and 1B are vertical sections of the box, there being a switch plate on the open front face of the box of FIG. 1A;

FIG. 6 is an enlarged, perspective view of a typical on-off switch and switch plate, showing the way in which the switch plate can be hooked onto a box of the type shown in FIG. 1 and showing the pins on the inner surface of the switch plate for making a single pole switch unit when the pins are coupled with certain terminals inside the box;

FIG. 7 shows a plain cover plate for wire function box with no pins necessary for connection;

FIGS. 8–15 show the front and back sides, respectively, of a number of different electrical components, including combinations of switches, receptacles and their respective cover plates and connection pins for the basic box of the present invention;

FIG. 18 is a fragmentary, perspective view of a retention strap for holding the boxes of FIGS. 16 and 17 together as a unit;

FIG. 19 is a perspective view on an enlarged scale of a connection unit between adjacent boxes which are ganged by placing the box of FIG. 16 adjacent to the box of FIG. 17;

FIG. 20 is a side elevational view of a clamp assembly for clamping the tension strap of FIG. 18 to the boxes;

FIG. 21 is an enlarged, fragmentary, vertical section through a catch mechanism on the back of a box to receive the retention strap of FIG. 18.

DETAILED DESCRIPTION OF THE PREFERRED EMBODIMENT

Figure 1:
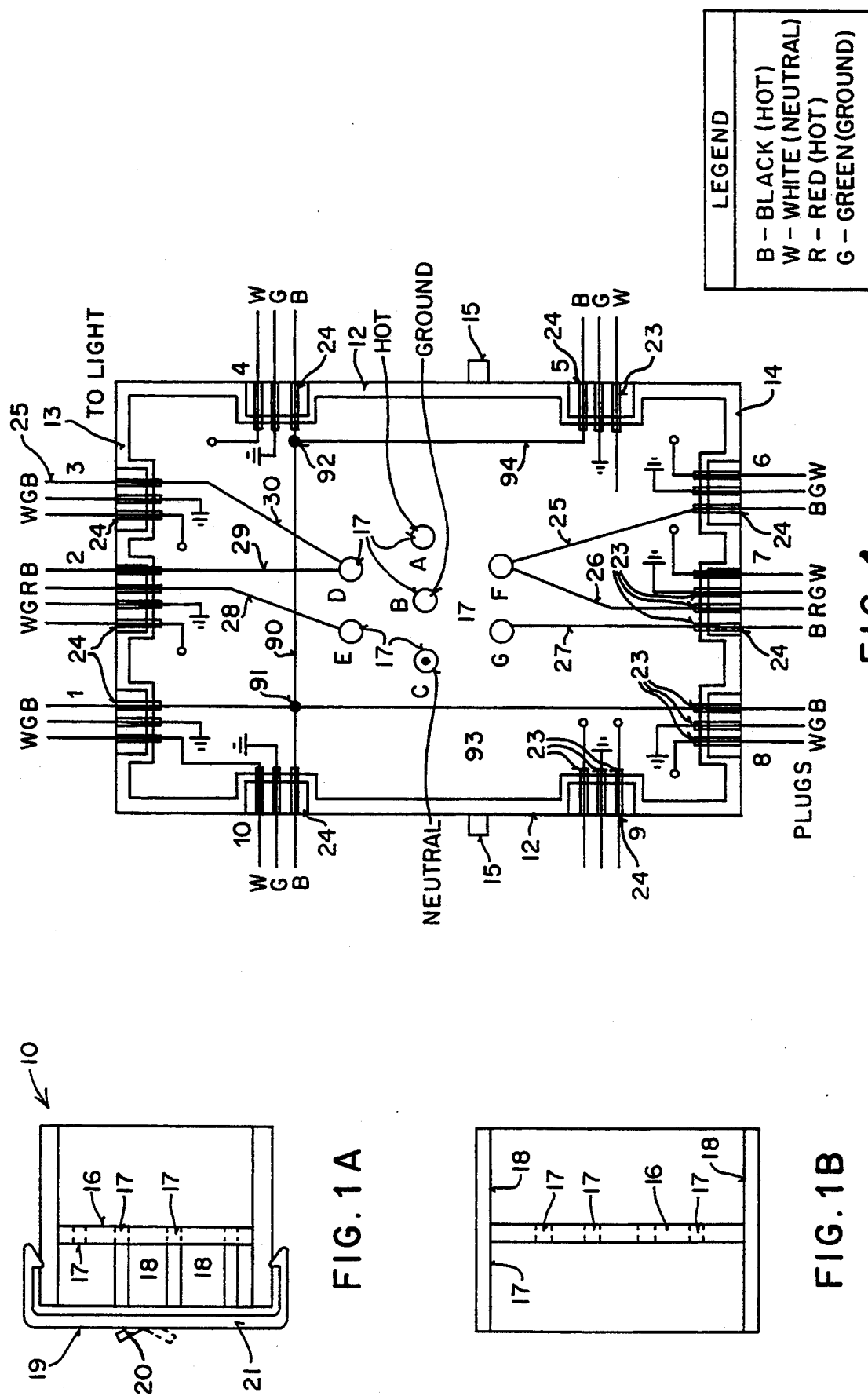
FIG. 1 is a schematic front elevational view of the basic electrical connection box of the present invention.

The electrical connection box assembly or basic box of the present invention is broadly denoted by the numeral 10 and is hollow in construction. It is rectangular to present a pair of spaced sides 12, a top wall 13, bottom wall 14, and means, such as flange means 15, for coupling the box to a stud or other structural part. Thus box 10 can be mounted in an upright position and can be coupled to a wall or wall stud. The box is then capable of being used to couple together in quick release fashion one or a number of different electrical components, such as switches, receptacles and the like to the junction box.

A printed circuit board 16 is preferably mounted in some suitable manner to the interior of the box 10 as shown in FIGS. 1A and 1B. Any suitable means, such as an epoxy or a projection on the inner surface of the box can be used to anchor board 16 in place as shown in FIGS. 1A and 1B.

Figure 2:
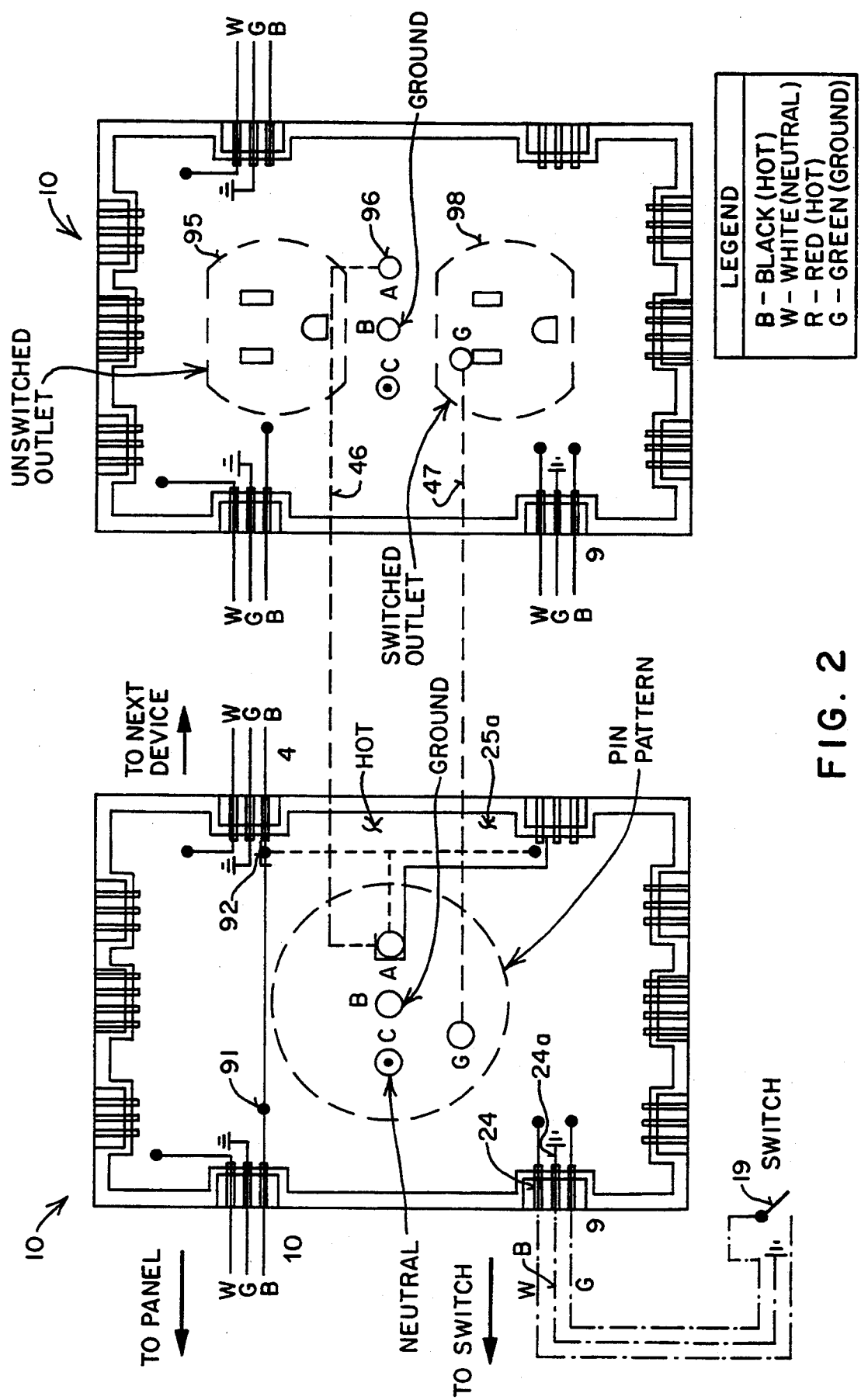
FIG. 2 is a front elevational view of a double box connection assembly using a pair of boxes of FIG. 1, the assembly being used to couple an electrical switch to an upper, unswitched receptacle and a lower, switched receptacle.

Board 16 has a plurality of electrical terminals 17 at predetermined locations thereon. Terminals 17 will sometimes hereinafter be referred to by the letter designations E, D, C, B, A, G and F as shown in FIGS. 1 and 2.

Terminals 17 have therethrough holes 23 for receiving pins 18 (FIG. 1A) of an electrical component 19 to be quick release coupled to box 10 and certain terminals 17. Component 19, for purposes of illustration, comprises an on-off switch having an actuator 20 shiftably mounted on a plate 21. FIG. 1A shows pins 18 inserted into holes 23 of certain terminals 17 through board 16. As shown FIG. 1, holes 23 are generally parallel with each other. The switch component 19 itself (FIG. 1A) is constructed so that, when the switch actuator 20 is raised and is in the full line position thereof shown in FIG. 1A, the switching action of switch 19 will cause terminals A and D to engage each other through switch 19 and thereby turn on a light or otherwise enable an electrical circuit. Moving the actuator 20 downwardly with respect to FIG. 1A, causes the switch-on action of the switch 19 to cause the bridge between terminals A and D to open and thereby cease the current flow between these two terminals. Other terminals 17 are shown in FIG. 1 and such terminals can be quick release coupled to other electrical components such as those shown in FIGS. 7–15 to enable such components for performing certain other functions.

Terminals 17 on board 16 are coupled by electrical leads to a number of voltage sources. For instance, terminal A is coupled to a hot side of an AC line. As shown in FIG. 1, terminal A is coupled by a circuit means to pin receiving tubes 23 of a pair of functional line attachments 24 at stations numbered 1 through 10 at spaced locations FIGS. 1 and 2) around the outer periphery of box 10. Each device 24 has at least three tubes representing hot (black), ground (green) and neutral (white). Another terminal on some of the devices 24 includes a hot (red) tube 23. Certain other leads, namely electrical leads 25, 26, 27, 28, 29 and 30 are hard-wired to certain terminals 17 and to certain tubes 23 of devices 24. Thus, each assembly of attachments 24 and terminals 17 which is connected by pins 18 (FIG. 1A) of a particular component shown in FIGS. 8–15, is adapted for a particular purpose, depending upon its connection between its conductors or tubes 23 and terminals 17.

The electrical components, selected from the group including the components of FIGS. 8–15, will determine the function of the assembly 10. For instance, in the case of on-off switch component 19 of FIG. 2, the pins 18 of the component are coupled to terminals C, B, A and G with terminal A being coupled to the hot lead 25. Thus, to turn a light on and off using the switch, the actuator 20 of switch 19 is manually opened and closed.

It is to be noted that a plurality of functional line attachments 24 are provided on the outer periphery of box 10 at stations 1 through 10 (FIG. 1). Some of the attachments 24 have three connector tubes 23 and some have four tubes 23. Those that have four tubes 23 have a pair of hot lines, namely the black and red leads.

With reference to the electrical leads that pass through tubes 23 and enter the interior of box 10, it is to be noted that all of the ground leads have been grounded in some suitable manner. Other leads which are neutral (W) are connected to C terminal; whereas, all of the terminals 23 corresponding to the hot lead (black or red) are coupled in some suitable manner to respective terminals G, F, A, E and D.

Figure 4:
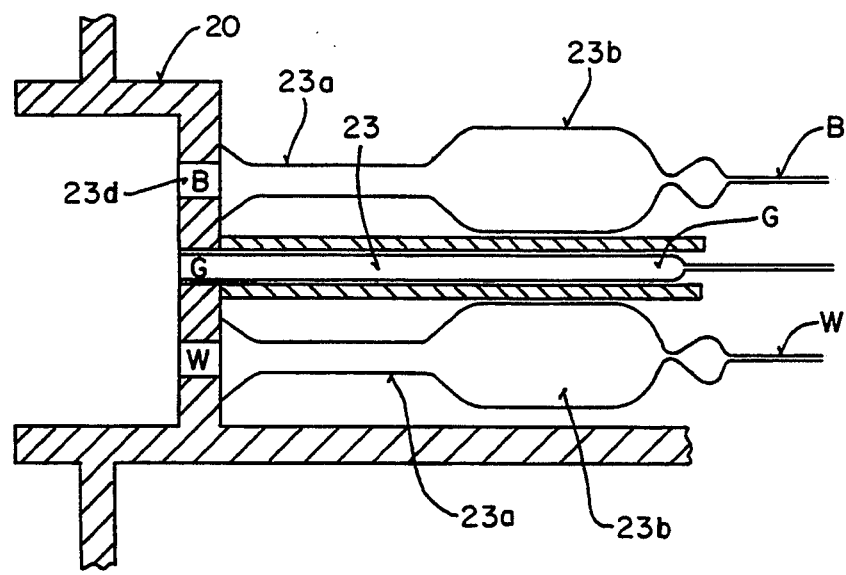
FIG. 4 is a vertical cross sectional view through an outer peripheral connection device to show its coupling with the outer periphery of a box.
Figure 4A:
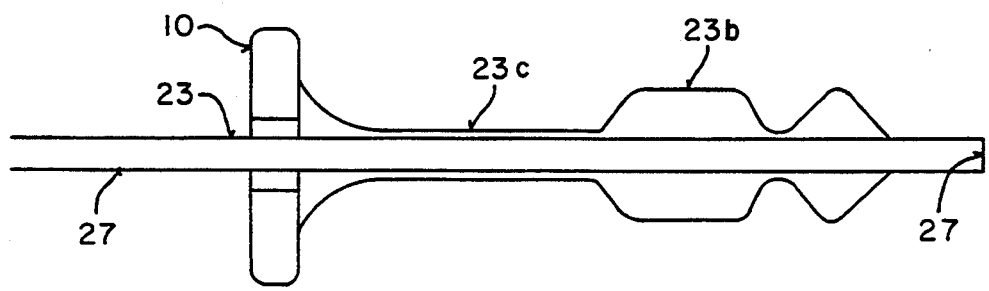
FIG. 4A is similar to FIG. 4 but showing one connection with wire inserted.

FIG. 4a shows the tubes 23 for receiving a pair of electrical leads from an electrical accessory, such as a light source or power source. Each tube 23 has a spring biased globular segment 23a and a second elongated, balloon-like segment 23b. Segment 23b is coupled by means of a tubular extension 23c to the entrance 23d of box 10, there being tubes 23 for receiving wire ends representing black (hot), green (ground), and W (neutral) and in some cases red HOT.

FIG. 4A shows in detail a wire end 27 from a lead of an electrical accessory, such as a light or power source, to be coupled through box 10 to an on-off switch of the type shown in FIG. 1A. Wire end 27 opens segment 23b, segment 23c and allows passage of the wire 27 through the wall having leads on the opposite side of the openings 23d in box 10. FIG. 4A also shows a lead 27 in electrical contact with tube 23 when the wire is in the tubular portion 23.

Figure 5:
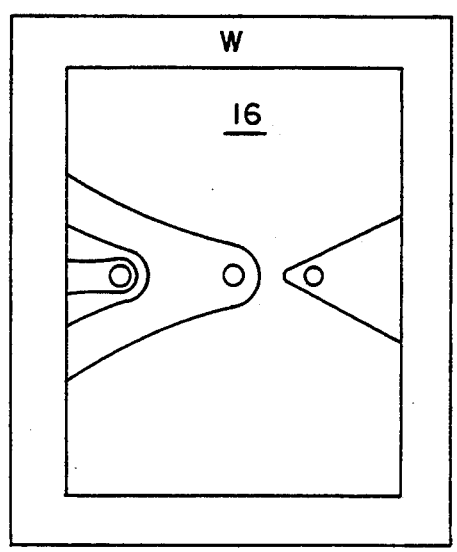
FIG. 5 is a view similar to FIG. 1 but showing the way in which a single electrical conductive pin is coupled to one of the wires of the box.
Figure 17:
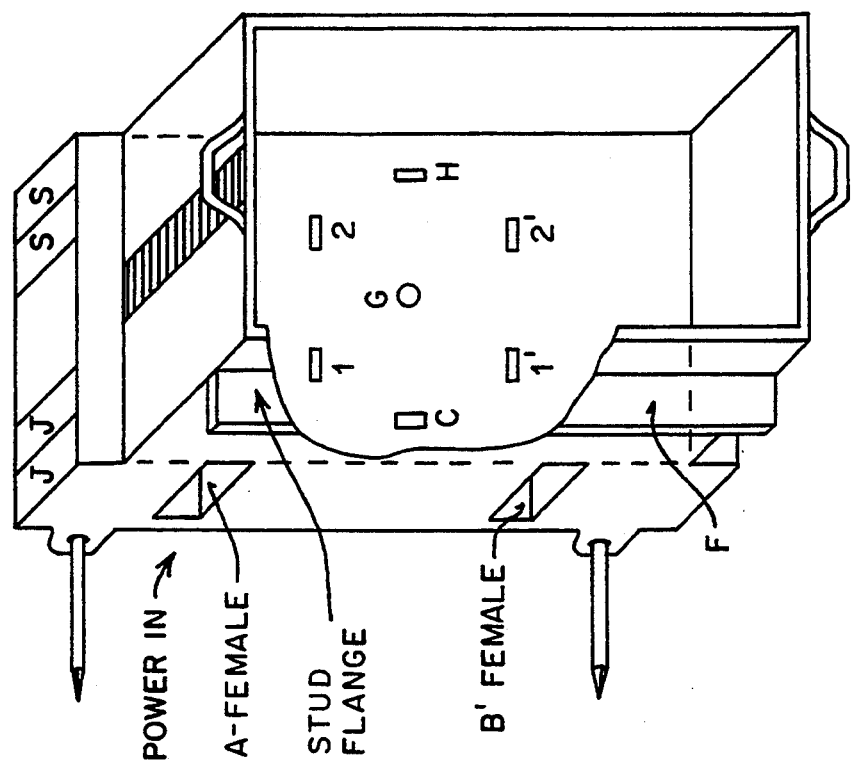
FIGS. 16 and 17 are perspective views of a pair of the basic boxes of the present invention which can be ganged together.

FIG. 5 shows another way, for example, to mount three terminals C, B, and A in place by mounts 26a which are electrically non-conductive. Mounts 26a are used in place of the pc board 16. Hard wiring is achieved for each electrical component which is used with a particular box 10 and is controlled by the voltages applied to the terminals in the box.

FIGS. 8-15 show a number of electrical components which can be used with the junction box 10 of the present invention. For instance, in FIG. 7, a plate having no electrical connection components thereon is used as a cover plate to cover the opening of the box 10. The box is to be used electrically as a junction box only.

FIG. 8 shows a pair of receptacles on one side of a plate and the arrangement of pins 18 on the opposite side of the plate to provide a split electrical receptacle, one switched and one not. FIG. 9 shows a three-way switch with the switch actuator shown on one side of the plate and the pin 18 on the opposite side of the plate to provide a 3-way switch for a light. The switch of FIG. 9 is to be contrasted with the switch of FIG. 10 which is simpler in that it has a fewer number of pins 18 on the inside of the plate and services a single pole switch means.

FIG. 11 shows another form of receptacle pair; FIG. 12 shows a pair of tandem switches; FIG. 13 shows a tandem switch arrangement with pins to provide a 3 way and regular switch. FIG. 14 shows a device to achieve a 4 way switch device when inserted into box 10; and FIG. 15 shows ground fault receptacle with appropriate attachment 24 and box 10.

Figure 16:
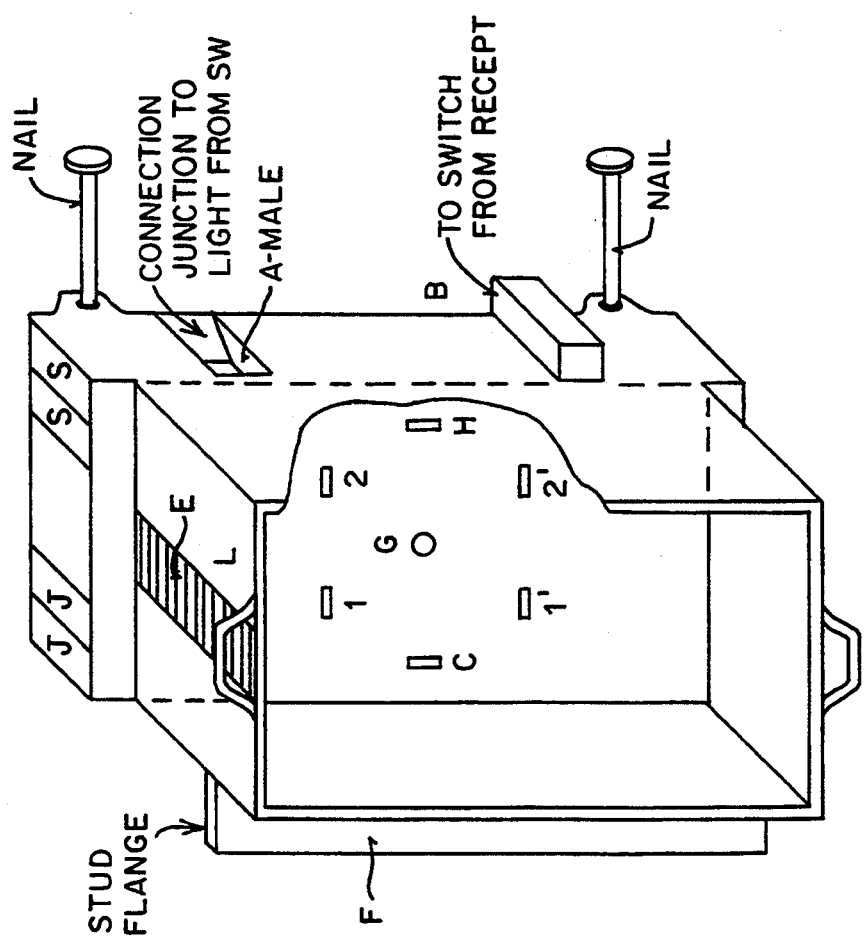

FIG. 16 shows other structural details of box 10. To this end, the box has loops 35 for stabilizing the covering appliance in forming a latch with leg 36 (FIG. 6) whereby the box can be closed to cover the terminals E, D, B, C, A, G and F which are recessed in the box. The terminals on the printed circuit board 16 and within the box are adapted to be hardwired to various external electrical accessories, such as lights and the like to be coupled to electrical power through the junction box 10.

Cover latch pins 36 (FIG. 6) are received within upper and lower loops 35 as shown in FIG. 16. The toothed outer ends of legs 36 are received within notches 37 in the upper and lower walls of the box as shown in FIG. 16. Nails 38 passing through loops 39 at the rear of the box also can be used for mounting the box in an upright position to studs or other framing structure.

A power transfer recess 40 is in one side 41 of box 10. It is adapted to receive a connection unit 42 (FIG. 19) having pins 43 and 44 for receiving connector members 42 in recesses 40 and 41 in the event that a pair of boxes 10 are to be ganged together.

When the boxes 10 are ganged together, as shown in FIG. 18, a retention strap 50 having a slot 52 therethrough is used with a catch key assembly 53 which includes a center pin 60 and a pair of clamp members 55 which grip the retention strap 50 and hold the three boxes 10 clamped together as shown in FIG. 18. The ends 56 and 57 of strap 50 are secured in some suitable manner to the adjacent studs 58 while the nut and bolt 54 passes through the center slot 52 of strap 50.

FIG. 21 shows a post 60 having recesses 61 and 62 for receiving the strap 50 at the back 62 of the box 10. The post 60 with recesses 61 and 62 is molded into the back 62 of the box. As the boxes 10 are plugged into preceding boxes to form gang boxes, the last box is slid into place and rotated 90° to couple all of the boxes together. The clamp assembly is provided to keep the boxes in place and to provide a safety factor against movement of the boxes relative to the adjacent studs 58.

Figure 22:
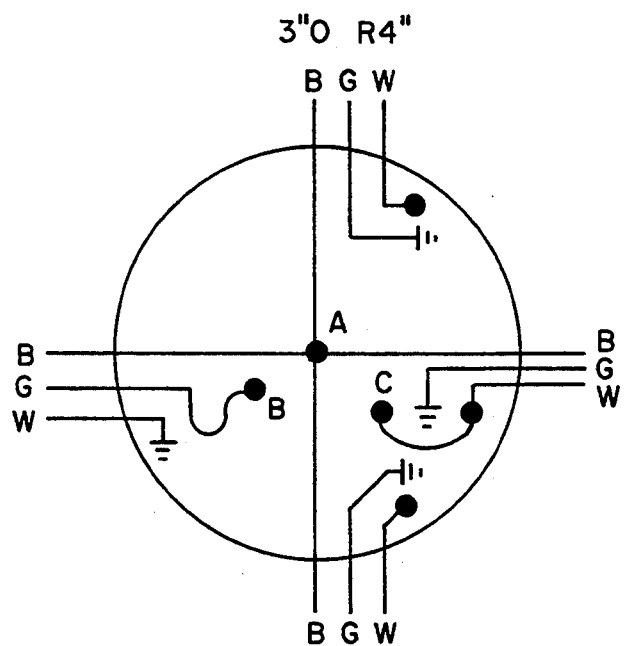
FIGS. 22 and 23 are plan and perspective views of a light box and receptacle, respectively, showing the way in which the receptacle is coupled to the light box.

FIG. 22 shows a wiring diagram for a light box for a light, usually in the ceiling. The light box has a unique design as shown in FIG. 22. As shown in this figure, all of the neutral (white) leads are connected and all the ground wires are connected to a plug in terminal B. All black wires go to various wire connector means for various functional uses and attach to terminal A. The electrical circuitry in FIG. 22 creates a box 70 in the ceiling, for instance, with three plugs in holes ready to receive a light appliance as shown.

Figure 23:
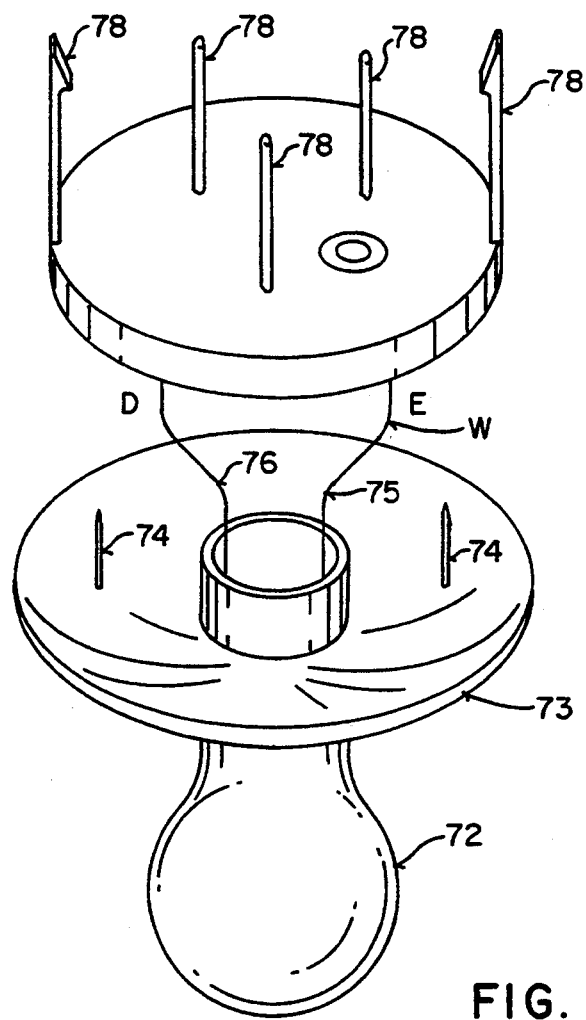

FIG. 23 shows a light source 72 having an escutcheon 73 and screws 74 for coupling the escutcheon in light to a ground post. Wires 75 and 76 are attached to black and white posts, respectively. The base 77 has legs 78 which hook light fixture escutcheon to the base and the assembly shown in FIG. 23 is plugged into the circuitry of FIG. 22 just like the base plate hooked into the other circuitry of FIG. 1.

OPERATION

FIG. 1 shows the basic electrical connection box or assembly 10 of the present invention. For purposes of illustration, some of the stations at the outer periphery of the box are hard-wired to circuitry external to the box 10.

In FIG. 1, the hot line 90 is in contact with a terminal 91 which receives its electrical power from one of the tubular members 23 of the lead coming into station 10 in the upper left hand corner of the box as shown in FIG. 1. Dashed line 93 provides another hot line or wire to another of the devices 24 at the outer periphery of the box. Another hot wire 94 extends from terminal A to a tubular member 23 of device 24 near the lower right hand corner of the box.

FIG. 2 shows a switch 19 coupled with a functional line attachment 24 which is to be hard-wired to pins C, B, A and G of box 10. The hot leads 91 and 92 are coupled to terminal A so as to provide electrical power to the switch 19 when the switch is coupled to pins C, B, A and G. An unswitched outlet 95 has a lead 96 which is yet to be coupled to the hot line A. On the other hand, a lead 97 couples terminal G with the receptacle 98 to provide a switched outlet.

Figure 3:
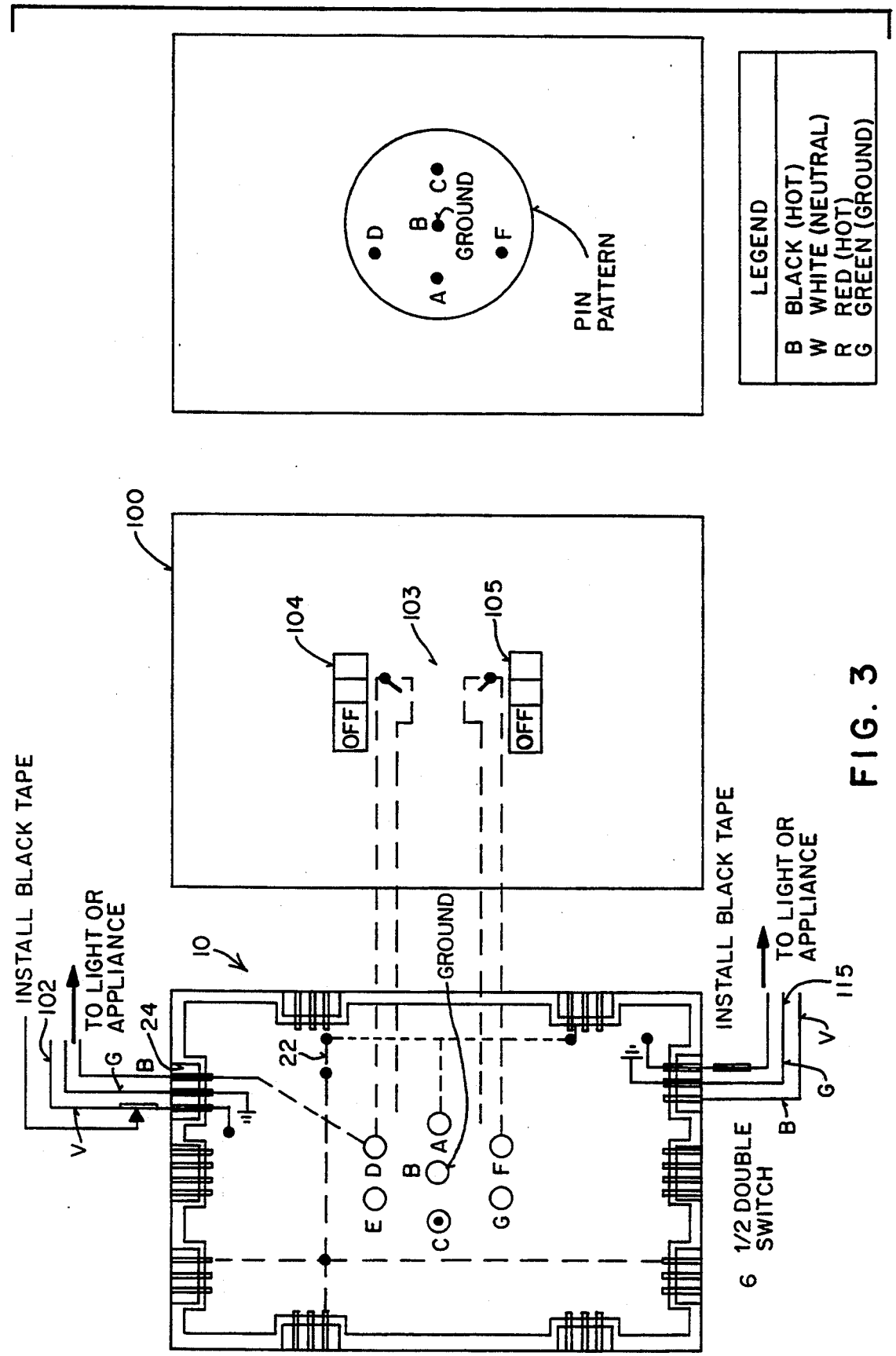
FIG. 3 is similar to FIG. 2 but showing examples of double switches.

A tandem switch is formed from box 10 when a component 100 has a front face as shown in the center portion of FIG. 3 and a back face on the plate has a pin pattern as shown on the right hand side of FIG. 3. Leads 102 lead from a device 24 to a light or other appliance to supply thereto when the power is directed to terminal A in box 10. The manual portions 104 and 106 of switch 108 are coupled by pins D, B, A and F to respective terminals on the circuit board in box 10. A second set of leads 115 can be used to couple a second light or appliance to the box so that tandem switch 108 can energize or enable the light or appliance when the switches 104 and 106 are actuated.

The terminals 17 of box 10 which are used for certain components are provided as follows:

TABLE A

| Component | Pin Pattern |
| --- | --- |
| Switch | A B D |
| Plug Receptacle | A B C |
| Tandem Switch (2W) | A B D F |
| Tandem (2 way with 3 way) Switch | A B D E F |
| Four Way Switch | E D F G B |
| Three Way Switch | A B D E |
| ½ Plug and ½ Switched Plug Receptacle | D B C A |
| Junction Junction | None |

TABLE A-continued

| Component | Pin Pattern |
| --- | --- |
| Ground Fault Receptacle | A B C |

What is claimed is:

1. An electrical connection assembly comprising:
a receptacle box having a plurality of functional line attachments at spaced locations thereon;
a plurality of spaced electrical terminals;
a board for mounting the terminals in the box in spaced, predetermined positions therein;
said plurality of functional line attachments each adapted to receive the wire of a respective electrical line, the outer end of the electrical line adapted to be coupled to a power-receiving member; and
means coupled with the terminals of the board for hard-wiring the terminals to at least certain of the attachments, whereby the terminals, once connected to the electrical contact elements of a functional circuit component will automatically couple the component to the power-receiving member when pins of the component are quick releasably coupled with the terminals of the box, said hard-wiring means including at least a first lead extending from one of the attachments to a first terminal and a second lead extending from the first terminal to a second terminal, each attachment including a number of tubular elements for receiving the leads of a respective electrical line, one of the leads of the line being electrically hot, and including a bridging lead bridging the hot electrical line with the corresponding element of an adjacent electrical line.

2. An electrical connection assembly comprising:
a receptacle box having a plurality of functional line attachments at spaced locations thereon;
a plurality of spaced electrical terminals;
a board for mounting the terminals in the box in spaced, predetermined positions therein;
said plurality of functional line attachments each adapted to receive the wire of a respective electrical line, the outer end of the electrical line adapted to be coupled to a power-receiving member; and
means coupled with the terminals of the board for hard-wiring the terminals to at least certain of the attachments, whereby the terminals, once connected to the electrical contact elements of a functional circuit component will automatically couple the component to the power-receiving member when pins of the component are quick releasably coupled with the terminals of the box, said box mounting means including a pair of spaced arms for a respective component, each arm having a boss on the outer end thereof, each boss being engageable with the box.

3. An electrical connection assembly comprising:
a receptacle box having a plurality of functional line attachments at spaced locations thereon;
a plurality of spaced electrical terminals;
a board for mounting the terminals in the box in spaced, predetermined positions therein;
said plurality of functional line attachments each adapted to receive the wire of a respective electrical line, the outer end of the electrical line adapted to be coupled to a power-receiving member; and
means coupled with the terminals of the board for hard-wiring the terminals to at least certain of the attachments, whereby the terminals, once connected to the electrical contact elements of a functional circuit component will automatically couple the component to the power-receiving member when pins of the component are quick releasably coupled with the terminals of the box, each functional line attachment including a number of tubular elements for receiving respective wires of the electrical line, one of the elements having a resilient bubble-like projection for applying a bias force to the wire when the wire is inserted in the one element.

4. An electrical connection assembly comprising:
a receptacle box having a plurality of functional line attachments at spaced locations thereon;
a plurality of spaced electrical terminals;
a board for mounting the terminals in the box in spaced, predetermined positions therein;
said plurality of functional line attachments each adapted to receive the wire of a respective electrical line, the outer end of the electrical line adapted to be coupled to a power-receiving member;
means coupled with the terminals of the board for hard-wiring the terminals to at least certain of the attachments, whereby the terminals, once connected to the electrical contact elements of a functional circuit component will automatically couple the component to the power-receiving member when pins of the component are quick releasably coupled with the terminals of the box;
a second box having a mounting board therewithin, said second box being substantially identical to the first box, the boxes being mounted in side by side relationship; and a retention strap coupled to the boxes as the boxes are ganged in side by side relationship, a clamp assembly for clamping the boxes together when the boxes are interconnected by the strap, and means on one end of the strap for mounting the same on a framing member to elevate the boxes above the floor.

5. An assembly as set forth in claim 4, wherein said strap has a central slot therethrough, said clamp assembly including a nut and bolt with the nut being on the end of the bolt and the bolt extending through the slot of the strap, and the nut and bolt clamping the two members together.

6. An electrical connection assembly comprising:
a receptacle box having a plurality of functional line attachments at spaced locations thereon;
a plurality of spaced electrical terminals;
a board for mounting the terminals in the box in spaced, predetermined positions therein;
said plurality of functional line attachments each adapted to receive the wire of a respective electrical line, the outer end of the electrical line adapted to be coupled to a power-receiving member;
means coupled with the terminals of the board for hard-wiring the terminals to at least certain of the attachments, whereby the terminals, once connected to the electrical contact elements of a functional circuit component will automatically couple the component to the power-receiving member when pins of the component are quick releasably coupled with the terminals of the box; said board having a circular outer periphery, said box contains said board therein and includes a light fixture with a plurality of mounting posts.

* * * * *